Dec. 23, 1958    L. E. MULLER    2,865,691
JOURNAL BEARING MEANS
Filed April 2, 1956
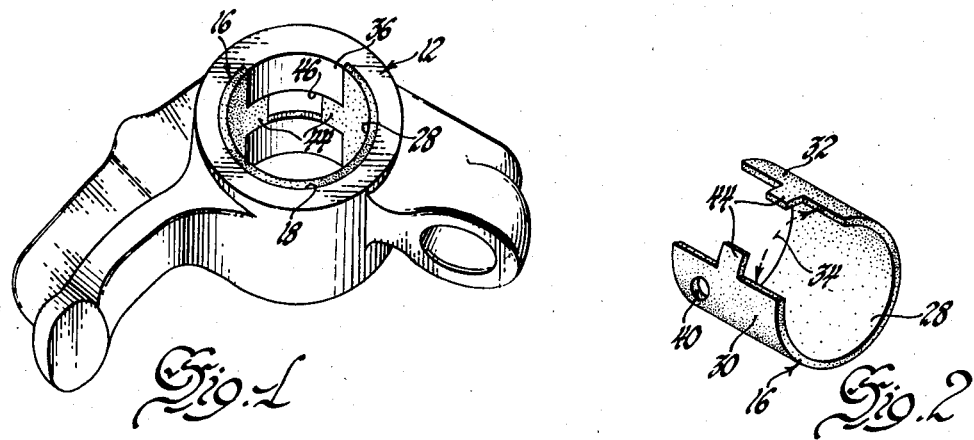
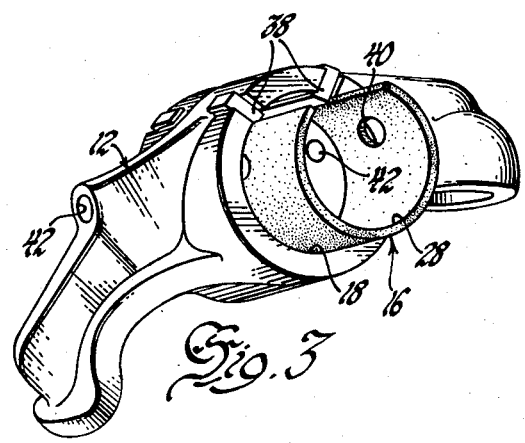
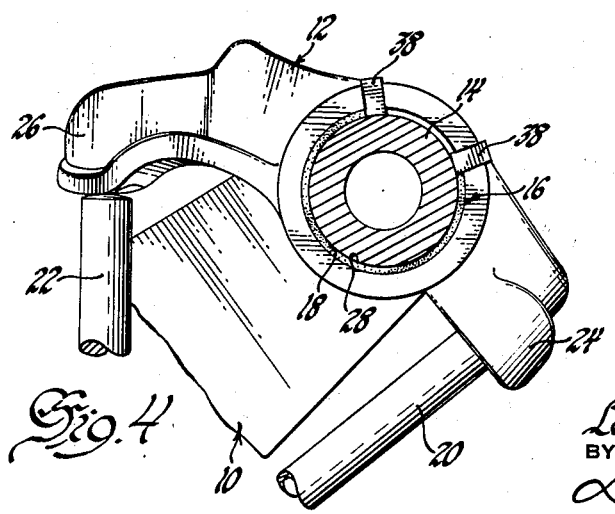
INVENTOR
Lloyd E. Muller
BY
L. D. Burch
ATTORNEY United States Patent Office 2,865,691
Patented Dec. 23, 1958

2,865,691

JOURNAL BEARING MEANS

Lloyd E. Muller, Flint, Mich., assignor to General Motors Corporation, Detroit, Mich., a corporation of Delaware Application April 2, 1956, Serial No. 575,452

3 Claims. (Cl. 308—237)

This invention relates to journal bearings, bushings and the like and more particularly to such bearing means as are adapted to have a load concentrated principally in one general area thereof.

Pivotal members having forces acting on opposite ends thereof, such as the rocker arm in a valve in head engine, have the journal load applied substantially in one concentrated area. In view of the added expense of the more durable bearing metals it is needless expense to provide a full bearing sleeve where only a part of the sleeve will be subjected to the bearing load.

It is therefore here proposed to provide a partial journal bearing sleeve insert which will dispose the bearing surfaces in the area where they will take the bearing loads without also extending within the unloaded areas. This results in a less expensive journal bearing and one equally as effective as those previously employed.

As with all sleeve type journal bearings the means of retaining the bearing means within the member it protects is a problem. In certain instances it is impractical to provide snap ring or other lock retainers and certainly the use of such means increases the cost of the assembly.

It is here proposed to provide relatively inexpensive retainer means particularly adapted for use with the partial bearing sleeve means suggested. Such retainer means as adapted to prevent axial movement of the partial journal bearing sleeve member preferably includes tabs formed from the gapped edges of the sleeve member and received within a lock groove provided within the member housing the bearing member. Rotation of the partial sleeve, on the other hand, is preferably prevented by stop means engaged with the housing structure and having the ends of the partial bearing member butted thereagainst.

To describe this invention and its objects and advantages in more detail reference is made to the drawings wherein:

Figure 1 shows a perspective view of a rocker arm member having a partial journal bearing sleeve mounted therein;

Figure 2 shows the journal bearing sleeve itself;

Figure 3 shows a journal bearing sleeve partially disposed within a rocker arm and having other retainer means from that shown in Figure 1; and Figure 4 is a side view of a fragmentary view of part of an engine showing the rocker arm and partial journal bearing sleeve as used therewith.

The present invention as employed with an overhead valve engine 10, a fragment of which is shown by Figure 4, and which includes rocker arm member 12 pivotally mounted upon a rocker arm shaft 14, makes use of journal bearing means 16 within the bore 18 provided through the rocker arm member. Push rod means 20 and valve stem means 22 are shown engaging opposite ends 24 and 26 of the rocker arm member and applying a bearing load principally concentrated about the lower portion of the bore 18.

The journal bearing means 16 includes a bushing member or liner 28, preferably of nylon composition, which is disposed within the bore 18 of the rocker arm housing 12 and extends only partially around the bore. The liner material may be sufficiently flexible to be formed to the shape of the bore as it is inserted within the bore or it may be preformed as a cylindrical or sleeve member having circumferentially spaced ends 30 and 32 with a gap 34 therebetween. The liner might also be considered to be a sleeve slotted from end to end to provide the spaced edges 30 and 32 separated by the gap 34.

The rocker arm 12 which is adapted to house the journal bearing liner 28 may be formed to extend within the bore 18, as shown in Figure 1 at 36, between the spaced ends 30 and 32 of the liner and in contiguous relation therewith. Such means prevents circumferential movement of the liner and retains it in a position where it will do the most good.

Another means of retaining the liner against circumferential movement is by having clip or stop means 38 engaged with the bearing receiving housing 12 and extending through the bore 18 adjacent the ends of the liner member 28, as is shown in Figures 3 and 4. With the liner restrained against the circumferential movement, apertures 40 may be provided in the liner adjacent lubricant passages 42 formed through the housing member so that lubricant may be fed to the journal bearing means.

The journal bearing liner 28 shown in Figures 1 and 2 includes tabs 44 formed from the ends thereof and extended towards each other. The means, such as the part 36 of the housing extending between the spaced ends 30 and 32 of the liner or the stops 38, may be formed to include a circumferential groove 46 as best shown in Figure 1 for receiving the tabs therein and preventing axial movement of the liner 28 within the bore 18.

It will be appreciated that in the use of the present invention only about two-thirds of the bore includes the journal bearing lining. However, the liner is disposed within the area where it is needed and is assured of remaining in such location without being moved circumferentially or axially. Thus a considerable saving is effected in using less of the more expensive journal bearing material without sacrificing the effectiveness of the journal bearing means.

I claim:

1. Journal bearing liner means including a sleeve member receivable within a shaft receiving bore provided within a housing member, said sleeve member being slotted from end to end to provide circumferentially spaced edges, and tabs formed from said edges and circumferentially disposed for cooperative engagement within receiving means provided within said bore between said spaced edges for preventing circumferential and axial movement of said sleeve member within said bore.

2. Journal bearing means including a housing member having a shaft receiving bore provided therein, a journal bearing liner received within said bore and extending partially therearound to provide circumferentially spaced ends within said bore, said housing including means extending between and engaging said spaced ends of said liner for preventing circumferential movement thereof and having circumferentially disposed tabs provided upon the spaced ends of said liner and extended towards each other within said bore, and tab receiving means provided between said spaced ends for preventing axial movement of said liner within said bore.

3. Journal bearing means including a housing member having a shaft receiving bore provided therein, a journal bearing liner received within said bore and extending partially therearound to provide circumferentially spaced ends within said bore, said housing including means extending between and engaging said spaced ends of said liner for preventing circumferential movement thereof; said last-mentioned means formed from said housing and extending contiguously with said liner about said bore, tabs formed from said spaced ends of said liner and circumferentially disposed and extended towards each other within said bore, and circumferential grooves formed within said housing between said spaced ends of said liner for receiving said tabs.

References Cited in the file of this patent

UNITED STATES PATENTS

| | | |
|---|---|---|
| 389,185 | Aldrich | Sept. 11, 1888 |
| 494,962 | Ley | Apr. 4, 1893 |
| 523,238 | Rarig | July 17, 1894 |
| 790,211 | Knox | May 16, 1905 |
| 1,629,818 | Ferris et al. | May 24, 1927 |
| 2,509,661 | Winter | May 30, 1950 |
| 2,713,525 | Hinman | July 19, 1955 |